(12) United States Patent
Wright et al.

(10) Patent No.: US 6,658,339 B1
(45) Date of Patent: Dec. 2, 2003

(54) DRIVER-PROGRAMMABLE DRIVING MODE SYSTEM FOR AUTOMATIC TRANSMISSIONS

(75) Inventors: Keith Wright, St. Preston (GB); Anthony Stasik, Coppull (GB); Paul Martin Fowler, Lymm (GB)

(73) Assignee: Eaton Corporation, Cleveland, OH (US)

( * ) Notice: Subject to any disclaimer, the term of this patent is extended or adjusted under 35 U.S.C. 154(b) by 78 days.

(21) Appl. No.: 09/715,888

(22) Filed: Nov. 17, 2000

(30) Foreign Application Priority Data

Nov. 26, 1999 (GB) ............................... 9927924
Oct. 19, 2000 (GB) ........................... 00256451

(51) Int. Cl.[7] .................. G06F 17/00; G06F 19/00; B60T 8/32; B60K 41/02; B60K 41/04
(52) U.S. Cl. ..................... 701/53; 701/52; 701/55; 701/64; 701/95; 477/777; 477/78; 477/81; 477/111; 180/170; 74/473.18
(58) Field of Search ................... 701/52, 53, 55, 701/64, 95; 477/77, 78, 81, 111; 180/170; 74/473.18

(56) References Cited

U.S. PATENT DOCUMENTS

| | | | |
|---|---|---|---|
| 3,961,546 A | 6/1976 | Gilmore et al. | 74/866 |
| 4,081,065 A | 3/1978 | Smyth et al. | 192/76 |
| 4,250,845 A | 2/1981 | Collonia | 123/361 |
| 4,305,359 A | 12/1981 | Mann et al. | 123/333 |
| 4,319,658 A | 3/1982 | Collonia et al. | 180/271 |
| 4,361,060 A | 11/1982 | Smyth | 74/866 |
| 4,461,254 A | 7/1984 | Pfalzgraf et al. | 123/350 |
| 4,595,986 A | 6/1986 | Daubenspeck et al. | 342/373 |
| 4,648,290 A | 3/1987 | Dunkley et al. | 74/866 |
| 4,735,109 A | 4/1988 | Richards et al. | 74/745 |
| 4,754,665 A | 7/1988 | Vandervoort | 74/745 |
| 4,800,360 A | 1/1989 | Dunkley et al. | 340/52 |
| 4,849,899 A | 7/1989 | Cote et al. | 701/63 |
| 4,873,881 A | 10/1989 | Edelen et al. | 74/336 |
| 4,899,279 A | 2/1990 | Cote et al. | 701/27 |
| 4,899,607 A | 2/1990 | Stainton | 74/335 |
| 4,930,078 A | 5/1990 | Dunkley et al. | 701/52 |
| 4,930,081 A | 5/1990 | Dunkley et al. | 701/52 |
| 4,945,484 A | 7/1990 | Cote et al. | 701/63 |
| 5,050,079 A | 9/1991 | Steeby | 701/52 |
| 5,053,963 A | 10/1991 | Mack | 701/53 |
| 5,109,729 A | 5/1992 | Boardman | 74/858 |
| 5,157,989 A | 10/1992 | Asada | 74/866 |
| 5,385,515 A | 1/1995 | Chan et al. | 477/75 |
| 5,390,561 A | 2/1995 | Stine | 74/331 |
| 5,406,861 A | 4/1995 | Steeby | 74/336 |
| 5,415,604 A * | 5/1995 | Bates et al. | 477/78 |
| 5,416,700 A | 5/1995 | Bates et al. | 701/52 |
| 5,506,771 A * | 4/1996 | Chan et al. | 477/78 |
| 5,527,237 A * | 6/1996 | Fowler et al. | 477/142 |

(List continued on next page.)

FOREIGN PATENT DOCUMENTS

EP 0711678 A2 11/1995
EP 0725237 A1 1/1996

*Primary Examiner*—William A. Cuchlinski, Jr.
*Assistant Examiner*—Brian J. Broadhead
(74) *Attorney, Agent, or Firm*—Rader, Fishman & Grauer PLLC

(57) ABSTRACT

A system for controlling an automated mechanical change-gear transmission system including a processing unit for processing inputs according to predetermined logic rules to determine currently engaged and allowably engaged gear ratios and throttle positions, for changing between automatic and semi-automatic transmission modes, for issuing command output signals to non-manually controlled operators, and for temporarily selectively overriding a pre-selected transmission mode if either cruise control or power take off are activated.

19 Claims, 4 Drawing Sheets

U.S. PATENT DOCUMENTS

| | | | |
|---|---|---|---|
| 5,636,120 A | | 6/1997 | Yesel et al. .................... 701/51 |
| 5,761,628 A | | 6/1998 | Steeby et al. ................. 701/64 |
| 5,816,100 A | * | 10/1998 | Fowler et al. ............. 116/28.1 |
| 5,819,585 A | | 10/1998 | Darnell ........................ 74/335 |
| 5,845,224 A | * | 12/1998 | McKee ........................ 477/78 |
| 5,875,410 A | * | 2/1999 | Fowler et al. ................. 477/78 |
| 6,095,002 A | * | 8/2000 | Tuson et al. ................. 477/118 |
| 6,151,977 A | * | 11/2000 | Menig et al. ............. 74/336 R |
| 6,202,780 B1 | * | 3/2001 | Tanaka et al. .............. 180/179 |
| 6,330,873 B1 | * | 12/2001 | Letang et al. ................ 123/322 |

\* cited by examiner

DRIVER-PROGRAMMABLE DRIVING MODE SYSTEM FOR AUTOMATIC TRANSMISSIONS

RELATED APPLICATIONS

This application claims the benefit of GB patent application Serial No. 9927924.2, filed Nov. 26, 1999 and GB patent application Serial No. 00256451.2, filed Oct. 19, 2000, the disclosures of which are incorporated in their entirety herein.

BACKGROUND OF THE INVENTION

1. Field of the Invention

The present invention relates to a driver-programmable driving mode system for automatic transmissions including the ability to select between automatic and manual transmission modes, a mode for automatically controlling the default start gear ratio on a vehicle, a mode for providing "cruise control" operation of the vehicle, and a mode for providing power take off operation of the vehicle.

2. Description of the Prior Art

Automatic transmission systems for heavy-duty vehicles such as heavy-duty trucks and coaches, and for automobiles, that sense throttle openings or positions, vehicle speeds, engine speeds, and the like, and automatically shift the vehicle transmission in accordance therewith are well known in the prior art. The known prior art transmission systems often use pressurized fluid to frictionally engage one or more members to other members or to a ground to achieve a selected gear ratio. Also known are automated mechanical transmission systems utilizing electric and/or pneumatic logic and actuators to selectively engage mechanical clutches to achieve a desired gear ratio.

Most automatic transmission systems including an automated mode of gear shifting, wherein the gear shifts are determined by a shift scheduling system, are designed so that the automatic transmission system works by default in the automatic shifting mode (i.e., automatic transmission mode). Such systems typically include a manual override, whereby the vehicle driver can select to operate the vehicle in a manual transmission mode (e.g., semi-automatic) requiring the driver to manually select the desired gear ratio. However, the driver is not provided with the ability to choose the default transmission mode, either automatic or manual. Thus, a driver who prefers to operate his vehicle in manual transmission mode must always override the automatic transmission mode. Further, the pre-configured systems do not provide the driver with the flexibility to change the default mode of operation for limited periods of time, whereby the driver would be able to configure the default mode for particular driving conditions.

SUMMARY OF THE INVENTION

In accordance with the present invention, a driver-selected driving mode system for automated transmissions includes an automatic transmission system having an electronic control unit ("ECU") with internal memory for storing a driver-determined driving preference for manual (e.g., semi-automatic) or automatic shifting. When a semi-automatic mode has been selected by a driver, the driver manually actuates a shift lever to semi-automatically change gears. The system reads the internal memory of the ECU on start up to determine driver transmission mode preference. Moreover, the driver can select a default preferred start gear ratio so long as the selected gear ratio is one that is acceptable to the ECU. Both the selected transmission mode and the start gear ratio are stored as a start mode when a manually operated selection device is activated for a period of time exceeding a reference period of time.

The driving mode system also includes a switch for toggling between manual and automatic transmission modes, whereby the driver can change shifting preference during vehicle operation. In a preferred embodiment, the automatic transmission control system includes a display screen to inform the driver of the mode in which the vehicle is operating, as well as display an acceptable range of gears ratios for shifting between during operation of the vehicle in the semi-automatic mode of transmission. Further, the driving mode system includes a cruise control and a power take off. If the vehicle is operating in a manual transmission mode upon cruise control activation, the automatic transmission mode will be temporarily invoked while the cruise control is activated. On the other hand, if the vehicle is operating in an automatic transmission mode upon power take off operation, the manual transmission mode will be temporarily invoked while the power take off is activated.

Other features and advantages of the invention will be apparent from the ensuing description in conjunction with the accompanying drawings.

DETAILED DESCRIPTION OF THE PREFERRED EMBODIMENT

Figure 1:
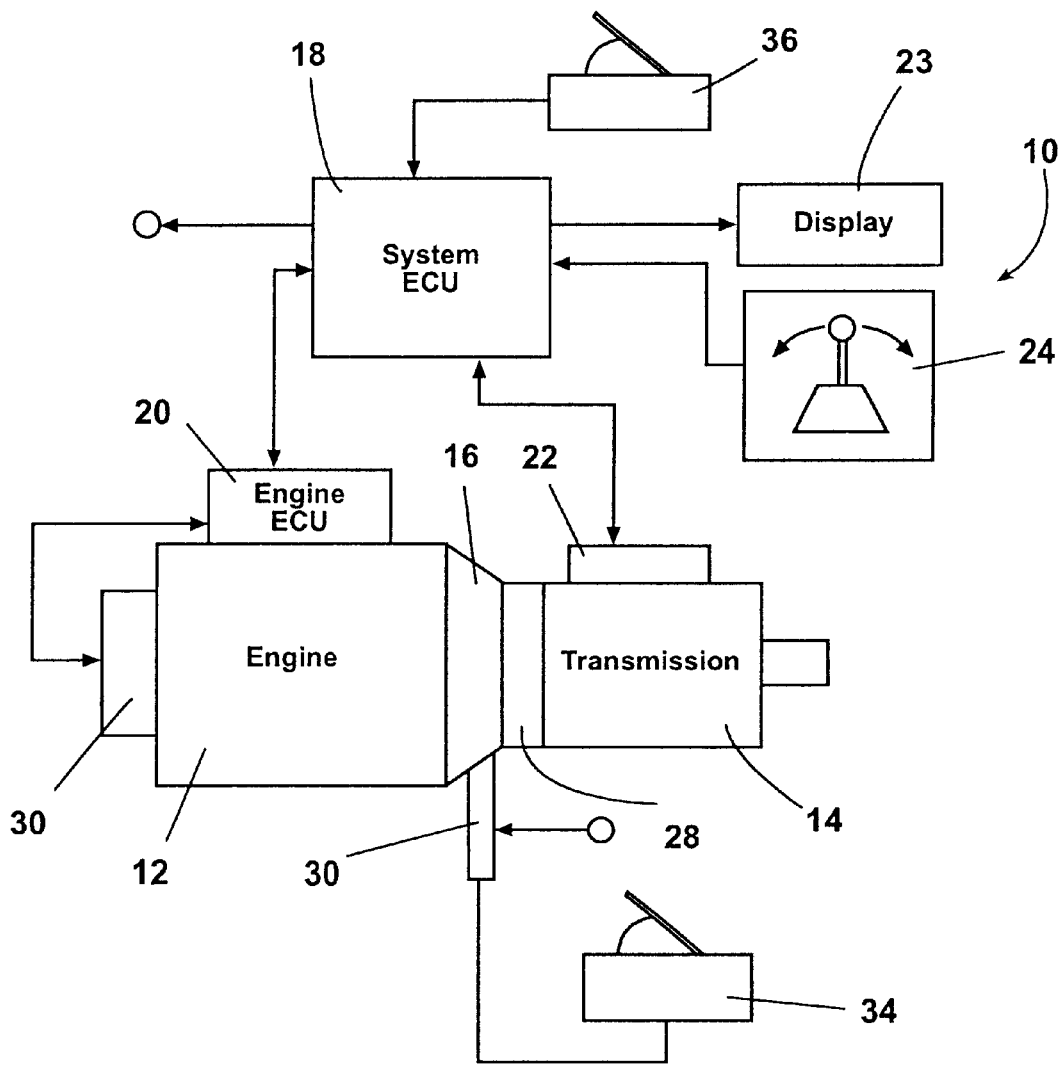
FIG. 1 is a schematic illustration of the driver-selected driving mode system for an automated mechanical change-gear transmission system of the present invention.

As shown best in FIG. 1, a driving mode system 10 is shown including an engine 12 interconnected to a transmission 14 through a master clutch 16 and controlled by a system electronic control unit ("ECU") 18. More particularly, the system ECU 18 is electronically connected to an engine ECU 20, which controls the engine 12 through inputs and outputs responsive to driver action and engine performance. Further, the system ECU 18 is connected to the transmission 14 through the transmission operator 22, which controls the transmission 14. The transmission operator 22 receives inputs and outputs for controlling transmission 14 from both driver action and the transmission itself. The driver is apprised of system performance through a display 23, which is interconnected to the system ECU 18 that monitors both the transmission operator 22 and the engine ECU 20. Finally, driver input is accomplished through manipulation of a manually operated selector 24. The selector 24 is movable in at least two directions to an activation position, most preferably for up- and down-shifting gear ratios, and includes at least one button for selecting a mode of operation of the transmission 14. The function of selector 24 is explained in greater detail below.

The transmission operator 22 controls the transmission 14 in response to signals from the system ECU 18. The transmission 14 is operated by the transmission operator 22 either automatically, called "automatic transmission mode", or non-automatically, called the manual transmission mode. Typically, the manual transmission mode is actually a semi-automatic mode.

In an automatic transmission mode, the system ECU 18 controls the shifting of gears of the transmission 14 to a signal sent to the transmission operator 22 based on inputs received from the transmission 14, the engine 12, and the driver, among other inputs. In the automatic transmission mode, the driver does not shift gears of the transmission 14. Instead, shifting is controlled by programmed logic in the system ECU 18.

When a manual transmission mode is selected the gear shift selections are made by the driver. The so-called semi-automatic transmission mode permits the driver to make gear shift selections from a range of permissible gears based on a variety of input variables, such as engine performance and vehicle speed. Thus, the driver determines when to shift gears, and to what gear to shift among the range of permissible gears. The listing of permissible gears is determined by the system ECU 18. The driver manually actuates the selector 24 to make the gear shift selection.

The term "transmission" as used herein includes both "simple" and "compound" type transmissions. A "simple transmission" means a change-speed transmission, wherein the driver may select one of a plurality of single gear reductions. A "compound transmission" designates a change-speed transmission having a main transmission portion and an auxiliary transmission portion connected in series whereby the selected gear reduction in the main transmission portion may be compounded by further selected gear reduction in the auxiliary transmission portion. "Compound transmission" includes a "splitter-type compound transmission," which designates a compound transmission wherein the auxiliary transmission is used to provide various selectable steps for subdivisions of the gear ratio selected in the main transmission portion. In a splitter-type compound transmission, the main transmission section is typically provided with relatively wide steps that are split or subdivided by the auxiliary section.

"Compound transmission" also includes a "range-type compound transmission," which refers to a compound transmission having an auxiliary section with a relatively large step, as compared to the ratio steps of the main transmission section. The term "upshift," as used herein, means shifting from a lower speed gear ratio into a higher speed gear ratio. The term "downshift," as used herein, means shifting from a higher speed gear ratio to a lower speed gear ratio. As used herein, the term "blip" designates a temporary increase in the supply of fuel to the engine 12, while the term "dip" means a momentary decrease in supply of fuel to the engine. Such terms usually are associated with engine fuel control or engine ECU 20 commanded increases and decreases, respectively, of the supply of fuel to the engine, independent of the driver-selected position of the throttle pedal.

The present invention is applicable to the control of any type of mechanical change-gear transmission adaptable for providing output signals to and receiving command signals from various electric, electronic, mechanical and/or fluid-operated control and/or sensing devices. The control system of the present invention, however, is particularly advantageously applied to a compound transmission of the type having a non-synchronized main transmission section connected in series with at least one auxiliary section of the splitter, range and/or combined splitter/range type. Such transmissions are known in the prior art and are described and illustrated in U.S. Pat. Nos. 4,735,109; 4,648,290; 4,754,665; 5,390,561; and 5,816,100, incorporated herein by reference. The transmission system may be coupled to a power unit through a conventional friction clutch, torque converter, or other convenience power coupling means.

Referring again to FIG. 1, information concerning the engine is communicated from the engine control ECU 20 to the system ECU 18, which is a processing and memory device. Communication may be over an electronic data link of the type confirming to SAE J1922, SAE J1939, ISO 11898 or any other applicable standard. The ECU 18 preferably receives inputs relative to engine speed or transmission input shaft speed from appropriate sensors, transmission output shaft speed from sensor 26, and actuation of selector 24. Transmission output shaft speed is an indication of vehicle ground speed and engine speed is an indication of transmission input shaft speed, and vice versa, especially if clutch 16 is non-slippingly engaged.

The present invention is equally applicable to systems where the control of the engine is achieved by mechanical methods. A suitable throttle position sensor and throttle pedal or "remote fuel control" or "fly-by-wire" system are known in the prior art and are illustrated by U.S. Pat. Nos. 4,250,845; 4,305,359; 4,319,658 and 4,461,254, the disclosures of which are incorporated herein by reference. Control logic circuits, sensors and actuators for the transmission system 10, as illustrated schematically in FIG. 1, may be as disclosed in aforementioned U.S. Pat. Nos. 4,361,060; 4,648,290; 4,930,081; 4,930,078; and 5,816,100. Specifically, system ECU 18 receives inputs, processes them in accordance with predetermined logic rules, and provides command output signals to pneumatic and/or electrical actuators for control of an input shaft brake 28 for rapid upshifts; engine fuel flow, or alternatively an engine ECU 20, to "blip" or "dip" the engine 12; an exhaust brake 30 to achieve rapid synchronous rotation in preparation for downshift or upshift clutch control via operator 30; and/or ratio shifting via transmission operator 22. The processing unit of the system ECU 18 may be of the type illustrated in U.S. Pat. No. 4,595,986 and may incorporate fault detection and tolerance logic of the type illustrated in U.S. Pat. Nos. 4,849,899; 4,899,279; and 4,945,484. The transmission operator 22 also may be of the "X-Y" type, as illustrated in U.S. Pat. Nos. 4,873,881 and 4,899,607, the disclosures of which are incorporated herein by reference.

The system ECU 18 also sends command output signals to the display 23, to be described in greater detail below. The driving mode system 10 may additionally comprises a typical foot-operated manual clutch control 34 intended for use only for start-from-rest and/or low speed creeping maneuvering situations. The system ECU 18 receives signals indicative of manual clutch control 34 position and of actuation of the vehicle brakes 36. Alternatively, the clutch control 34 may be eliminated and the operation of the clutch fully automated under the control of the system ECU 18. The driving mode system 10 also includes sources of electric and/or pneumatic power (not illustrated).

The system ECU 18 may be located in a single box or may in fact be distributed across a number of sites on the vehicle, one of which could be on the transmission housing itself, another of which could be in or near the cab of the vehicle. The system ECU 18 is connected to a display 23 of the type shown in FIGS. 2A and 2B, detects permissible gear shift ranges, indicates a default start mode for the transmission 14, and controls the operating mode of the transmission 14 in response to the driver's selection of cruise control and power take off operations.

The shifting means is preferably selector 24, but may be buttons or a toggle or any other suitable device or combination of devices. Such levers or other devices can be mounted on the vehicle dashboard or fascia, but are more conveniently mounted on the steering column in the same way as other known steering column switches.

Figure 3:
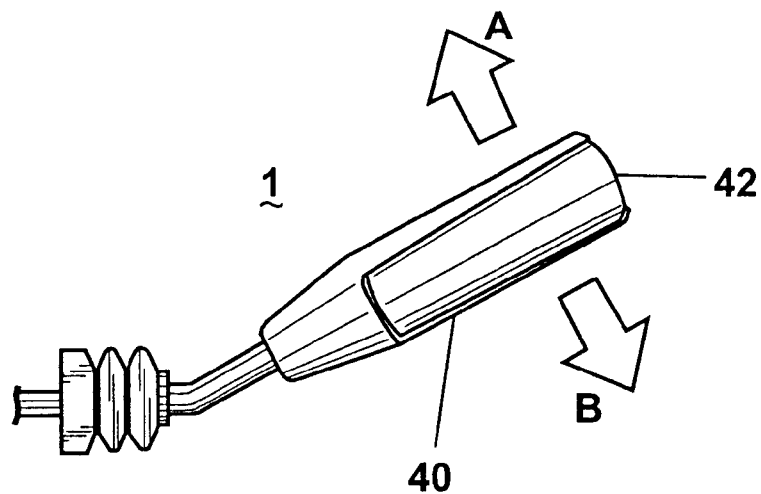
FIG. 3 is a perspective view of the driver's manual shift control.

Preferably the selector 24 is the type shown in FIG. 3, including a lever 40 movable in at least an up and down direction. Further, the lever 40 has a depressible button 42 at the end of the stalk. The lever 40 is movable to up- or downshift gear ratio activation positions, and selects the default starting mode as discussed below. The button 42 is depressible to change between automatic and manual shifting modes.

Figure 2B:
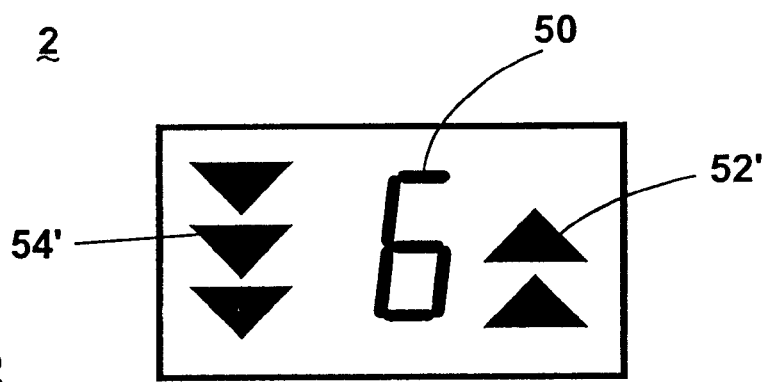
FIG. 2B is an enlarged view of the preferred display indicating manual transmission mode.
Figure 2A:
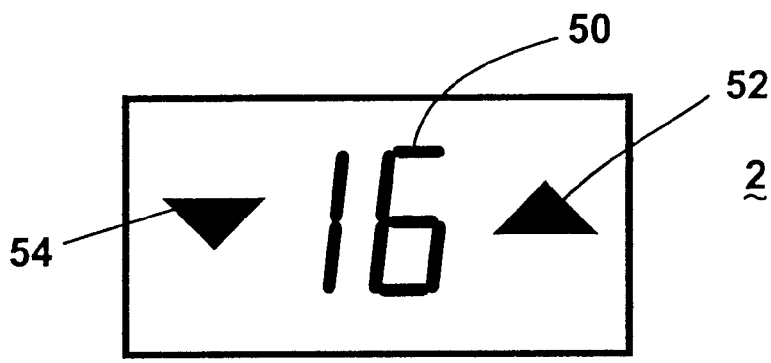
FIG. 2A is an enlarged view of the preferred display indicating automatic transmission mode.

Referring to FIG. 2A, the display 23 includes upshift indicator section 52, downshift indicator section 54, and currently engaged gear ratio indicator section 50 As illustrated, the currently engaged gear ratio display section 50 is presently displaying a "16," indicating that the vehicle transmission is operating in sixteenth gear. The single arrows oppositely disposed adjacent the number "16" indicate the transmission is in automatic mode. As shown in FIG. 2B, the downshift display section 54' has three lit downward arrows on one side and two lit upward arrows on opposite sides of the gear ratio display section 50 (showing "6) indicating the maximum number of consecutive downshifts and upshifts permitted according to the sensed input parameters, such as sensed engine or input shaft speed and sensed output shaft speed as processed by the system ECU according to the predetermined logic rules or program. The multiple shift arrows indicate the transmission is in manual transmission mode. In the present situation, the three lit downward arrows indicate that a single, double or triple downshift is permissible. Accordingly, the driver may select a permissible shift directly to either fifth, fourth or third speed. The upshift display section 52' has two lit arrows indicating the maximum number of consecutive upshifts permitted according to the sensed parameters as processed by the predetermined logic or program. In the present situation, the two lit arrows in display section 52' indicate that the transmission may be permissibly upshifted to either seventh or eighth gear.

The processing unit of the system ECU 18 will not issue command signals to execute a selected but impermissible ratio change. Preferably, the processing unit will execute the closest permissible ratio change to that selected by the driver. By way of example, assuming the conditions indicated by display 23 in FIG. 2B, should the driver select a downshift to second gear, such a downshift will not be executed by the system ECU 18 as being impermissible. In the preferred embodiment, however, the system ECU 18 will issue command output signals for a triple downshift from sixth gear to third gear. Not only is an impermissible ratio change refused, but the driver usually already will have been advised by display 23 that the ratio should never have been attempted or selected.

Fully automatic transmission systems that include sensors for sensing the throttle openings or positions, vehicle speeds, engine speeds, and the like, and automatically shift the vehicle transmission in response to those inputs, are well known in the prior art. Such fully automatic change-gear transmissions include transmissions wherein pressurized fluid is utilized to frictionally engage one or more members to other members or to a ground to achieve a selected gear ratio in automated mechanical transmissions utilizing electronic, hydraulic, and/or pneumatic logic and actuators to engage and disengage mechanical (i.e., positive) clutches to achieve a desired gear ratio. Examples of such transmissions are described in U.S. Pat. Nos. 3,961,546; 4,081,065; 4,361,060; 5,050,079; and 5,109,729, the disclosures of which are incorporated herein by reference.

Semi-automatic mechanical transmission control is also known in the prior art, wherein automated changes between a plurality of gear ratios are selected by the driver. Normally, the driver chooses when to make a particular gear ratio change and whether to select the immediately consecutive ratio up or down or to skip one or more ratios. Examples of such a semi-automatic transmission control can be seen by reference to U.S. Pat. Nos. 4,648,290; 4,800,360; 4,930,081; 5,385,515; 5,406,861; and 5,816,100, the disclosures of which are incorporated herein by reference.

Operating the driving mode system 10 in manual transmission mode means semi-automatic control of the transmission 14 through operator 22 via the system ECU 18. It is called "manual transmission mode" because the driver must manually actuate the selector 24, despite the actual gear change being automated and controlled by the transmission operator 22. For manual transmission mode (or semi-automatic transmission operation), to shift transmission 14, the driver moves lever 40 to an activation position (e.g., forward for upshifts and rearward for downshifts) from the position illustrated in FIG. 3. To select a single upshift (i.e., a shift to seventh gear), the driver will move lever 40 up once (in direction of arrow A) and the lever will then return to the neutral or centered position under bias. If, in sixth gear as shown in FIG. 2B, the driver moves the lever forward from the non-displaced position two times in quick succession and then allows its return to rest, he will skip one gear, in effect, and achieve a skip shift directly into eighth speed (i.e., seventh speed will not be engaged) almost instantaneously. The declutching of the master clutch 16 and synchronizing of the selected jaw clutch members associated with the selected gear ratio is achieved automatically and rapidly due to automatic throttle and clutch control and braking of the input shaft and/or the engine. The manual transmission mode is semi-automatic and the driver must exercise his discretion as to when to up- or downshift, and as to how many gear ratios to up- or downshift, but is not called upon to coordinate gear lever, throttle pedal and clutch actuation. Once the driver has selected a permitted gear ratio, the throttle is blipped to achieve necessary synchronization during a downshift, or dipped for achieving necessary synchronization during an upshift, all of which is done automatically for the driver by the system ECU 18 in conjunction with engine fuel control or engine ECU 20.

The reverse mode of operation may be achieved only from the neutral, at-rest position and then is achieved by moving control lever 40 backward (in the direction of arrow B) from the currently engaged neutral position. To prevent an inadvertent "downshift" into reverse, a reverse button (not shown) may be provided, which button must be depressed prior to the processing unit's interpreting a backward movement of the selector 24, when in the neutral position, as a request for reverse operation. Other methods of preventing inadvertent operation of reverse gear may be applicable. One example is any type of toggle switch or button, which may be located on the shift lever 40.

Upshifts and/or downshifts involving both the main and auxiliary section (i.e., compound shifts) are equally simple for the driver to achieve as those involving only the auxiliary section (i.e., a split shift). In those transmissions provided with multiple reverse gear ratios, the transmission may be downshifted into lower reverse ratios and upshifted into higher reverse ratios by movement of the control lever 40 backward and forward as indicated.

A single movement or pulse of the lever 40 is a movement of the lever from the centered or non-displaced/non-selected position to a displaced or selection activation position, in either the upshift or downshift direction, and then the immediate release of the lever, allowing the lever to return to the centered or non-displaced/non-selected position thereof If the control lever 40 is retained in the displaced or selection position for more than a predetermined period of time (for example, for more than 0.5 to 1.0 seconds, or for more than one or two seconds), an alternative logic controls the resulting function.

The system ECU 18 allows the driver to program the default mode of operation of the transmission to either the automatic or manual transmission mode. Further, during programming of the default start mode for the transmission, the driver is also able to select the default start gear ratio. The driver is able to change the default mode for the transmission and the default start gear by programming the internal memory of the system ECU 18.

Figure 4:
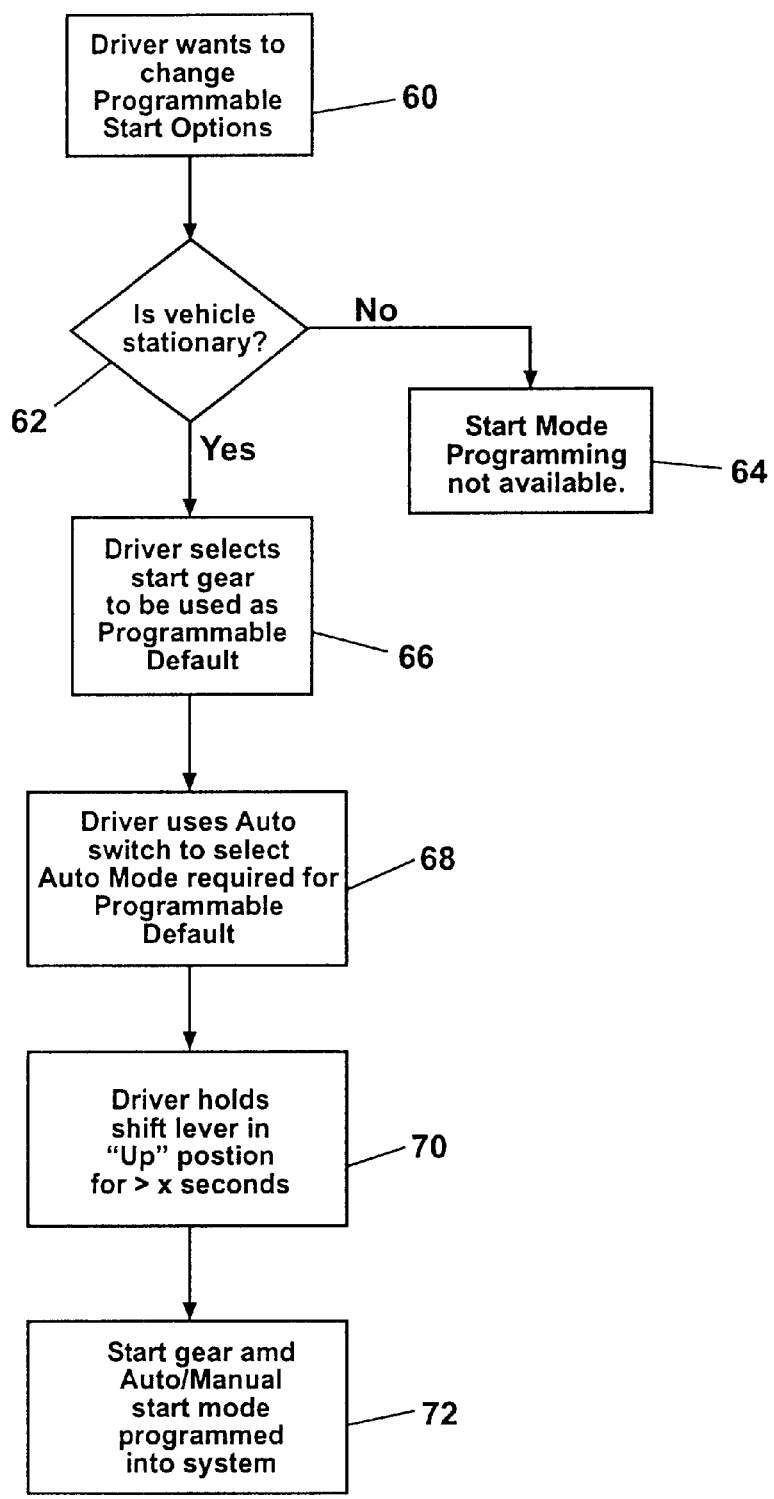
FIGS. 4 and 5 are schematic illustrations in flowchart format of the driving mode system and a preferred method of the present invention.

In accordance with the flow chart of FIG. 4, the driver changes the programmable start options for the transmission 14 and start gear ratio by first deciding that he wishes to change the programmable start options at point 60. System 10 determines if the vehicle is stationary at point 62. If the vehicle is not stationary, the start mode programming is not available as shown at point 64. When the vehicle is stationary, the driver selects the gear ratio to be used as the default start gear ratio as shown at point 66. The system ECU confirms that the desired start gear ratio is permissible. If not, the driver must select a new desired start gear ratio that is acceptable to the system ECU 18. The driver then selects the automatic transmission mode (or Auto Mode on flowchart) at point 68 by depressing the transmission mode switch 42 (or Auto Switch on flowchart) to signal to the system ECU 18 that the automatic mode is selected. Preferably, the display 23 shows the selected transmission mode as described above.

After the automatic mode for the transmission 14 has been selected, the driver holds the shift lever 40 in the up position for greater than a pre-selected amount of time as shown at point 70. Preferably, the time should be long enough to prevent accidental engagement of the programming mode. Thus, holding the shift lever 40 in the up position for greater than three (3) seconds is preferred, while, of course, a shorter or longer time period may be used. Also, note that while holding the shift lever 40 in the up position has been described, holding the shift lever 40 in a down position, or forward or rearward position, could alternatively be used to enter the programming mode. Finally, upon selecting both the start gear ratio, entering the automatic mode for the transmission 14, and holding the shift lever in the required position for the required amount of time, the start mode has been programmed to the internal memory of the system ECU 18 for both the start gear ratio and transmission mode as shown at point 72 of the flow chart of FIG. 4.

To change the transmission 14 from a default automatic transmission mode to a default manual transmission mode the driver simply enters the programming mode by maintaining the vehicle stationary and engaging the transmission mode switch 42 to toggle to the previously non-default mode. Next shift lever 40 is maintained in the required activation position for the required amount of time. Once these steps have been completed, the internal memory of the system ECU 18 is rewritten to signal that the default start preference is a manual transmission mode. The previously selected start gear ratio is not updated in this example, but could be. Thus, it is possible to select a default transmission mode without changing the default start gear ratio. Alternatively, it is possible to modify the desired start gear ratio without changing the default transmission mode.

Control systems for automated transmission systems typically include a selectable mode of operation referred to as a "cruise control". When cruise control is activated a selected vehicle speed is automatically maintained without requiring the driver to manually control the fuel throttle or to select or implement transmission shifts. A preferred cruise control system is described in U.S. Pat. No. 5,053,963, which is incorporated herein by reference. The system ECU 18 preferably includes a cruise control system, which is an electronic control system wherein gear selection shift decisions are made and executed upon measured and/or calculated parameters such as current input shaft or engine speed, throttle position, output shaft, or vehicle speed and/or the rate of change thereof and/or expected engine speed or vehicle speed at the completion of a potential shift. Further, a predetermined program operates shift commands in the cruise control mode, whereby a selected vehicle speed is automatically maintained without requiring driver manipulation of the throttle pedal.

In relation to an automatic transmission mode, the cruise control mode of operation is simply an enhanced mode of vehicle operation wherein not only are the gear shift decisions being controlled by the system ECU 18 but so are the throttle decisions. Thus, when the driver selects the cruise control mode of operation, preferably via a selectable button, switch, or toggle on the dashboard fascia or connected to the steering column, the vehicle enters the automatic transmission mode if it is not already in that mode. Also, when the driver decides to exit the cruise control mode of operation, the system ECU 18 must return the vehicle to the proper mode of transmission; that is, the mode of transmission the vehicle was operating in immediately preceding the driver's selection of the cruise control mode of operation.

Another feature often used with vehicle engines and their transmissions is power take off, which is a gear-drive device that is operated from the gear box or from the engine to, for example, raised platforms for loading and unloading pay load, or mixing cement. Essentially, power take off requires that some of the power generated from the engine and its transmission be diverted to the accessory device being operated by the vehicle. Thus, it is necessary that the vehicle operate in a manual transmission mode during operation of the accessory devices so that, for example, concrete will not deliver faster or slower depending on the system ECU 18 control of the transmission when operating in an automatic mode. Thus, when the driver selects a power take off device for operation, the automatic mode of transmission is disabled until use of the accessory device has been completed. After power take off use is complete, the vehicle reverts back to the transmission mode preceding the use of power take off.

Figure 5:
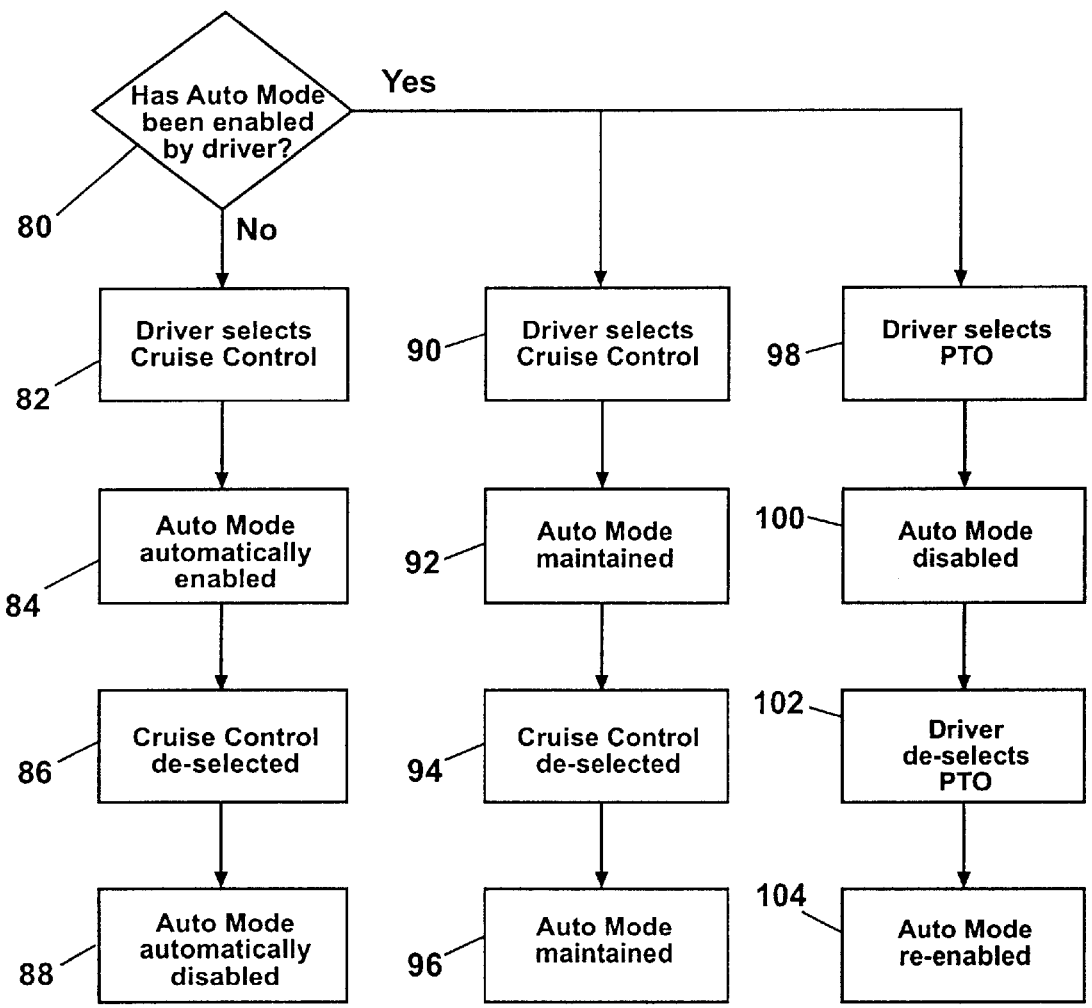

With reference to FIG. 5, the control logic of the system ECU 18 in response to the driver's selection of cruise control or power take off modes of operation is illustrated. First, when the driver selects cruise control, the first step of logic is to determine whether the transmission is operating in an automatic transmission mode as shown at decision point 80. If it is not, when the driver selects cruise control at point 82, the manual transmission mode is temporarily disabled. Then when the driver exits the cruise control mode of operation at point 86, the automatic transmission mode is also terminated at point 88 with the manual transmission mode re-nabled.

When the driver selects cruise control when operating in the automatic mode of transmission at point 90, the automatic mode of transmission is maintained as shown at point 92 while the system ECU 18 controls fuel flow in response to all the measured parameters. Then, when the cruise control mode of operation is exited at point 94, the automatic mode of transmission is maintained as shown at point 96 of the flowchart of FIG. 5 as it was before cruise control was selected by the driver.

Similarly, when the driver selects power take off ("PTO") when using the automatic transmission mode at point 98, system ECU 18 disables the automatic transmission mode at point 100, temporarily placing transmission 14 into the manual transmission mode until the driver exits the power take off mode at point 102. Then the automatic transmission mode is re-enabled at point 104. If manual transmission mode has already been selected, power take off operates without interruption or control of the manual transmission mode by the system ECU 18.

While the invention has been specifically described in connection with certain specific embodiments thereof, it is to be understood that this is by way of illustration and not of limitation, and the scope of the appended claims should be construed as broadly as the prior art will permit.

What is claimed is:

1. A driving mode system comprising:
    a multiple-speed, change-gear mechanical transmission;
    a manually operated selection device for selecting one of an automatic transmission mode and a manual transmission mode, and for selecting a sear ratio; and
    a processing unit for receiving inputs indicative of operation of said selection device and for processing said inputs according to predetermined logic rules to determine currently engaged and allowably engaged gear ratios and throttle positions, for changing between automatic and manual transmission modes, and for issuing command output signals to non-manually controlled operators;
    wherein said processing unit sets both a default start mode, representing one of said automatic transmission mode and manual transmission mode, and a default start gear ratio when said selection device is placed in an activation position for a predetermined period of time.

2. A driving mode system as recited in claim 1, wherein said predetermined period of time is in a range of approximately one to three seconds.

3. A driving system as recited in claim 1, wherein operation of said selection device causes an activator to toggle said transmission between said automatic and manual transmission modes.

4. A driving system as recited in claim 3, wherein movement of said selection device into said activation position for an amount of time less than said predetermined period of time represents a shift to said processing unit.

5. A driving system as recited in claim 1, wherein a display shows whether said driving system is in said automatic transmission mode or manual transmission mode.

6. A driving mode system comprising:
    a multiple-speed, change-gear mechanical transmission;
    a manually operated selection device for selecting one of an automatic transmission mode and a manual transmission mode, and for selecting a gear ratio;
    a processing unit for receiving inputs indicative of operation of said selection device and for processing said inputs according to predetermined logic rules to determine currently engaged and allowably engaged gear ratios and throttle positions, for changing between automatic and manual transmission modes, and for issuing command output signals to non-manually controlled operators; and
    a cruise control, wherein upon driver activation of said cruise control while said transmission is in said manual transmission mode, said processing unit temporarily invokes said automatic transmission mode, and upon de-activation of said cruise control, said processing unit re-establishes manual transmission mode,
    wherein said processing unit sets both a default start mode, representing one of said automatic transmission mode and manual transmission mode, and a default start gear ratio when said selection device is placed in an activation position for a predetermined period of time.

7. A driving system as recited in claim 6, wherein said processing unit maintains said automatic transmission mode upon driver activation and deactivation of said cruise control when said driving system is in said automatic transmission mode prior to activation of said cruise control.

8. A driving mode system comprising:
    a multiple-speed, change-gear mechanical transmission;
    a manually operated selection device for selecting one of an automatic transmission mode and a manual transmission mode, and for selecting a gear ratio;
    a processing unit for receiving inputs indicative of operation of said selection device and for processing said inputs according to predetermined logic rules to determine currently engaged and allowably engaged gear ratios and throttle positions, for changing between automatic and manual transmission modes, and for issuing command output signals to non-manually controlled operators; and
    a power take off wherein said processing unit temporarily invokes said manual transmission mode upon driver activation of power take off when said driving mode system is in said automatic transmission mode, with said automatic transmission mode re-established by said processing unit when said power take off is de-activated,
    wherein said processing unit sets both a default start mode, representing one of said automatic transmission mode and manual transmission mode, and a default start gear ratio when said selection device is placed in an activation position for a predetermined period of time.

9. A driving system as recited in claim 8, wherein said processing unit maintains said manual transmission mode upon driver activation and deactivation of said power take off when said driving system is in said manual transmission mode prior to activation of said power take off.

10. A driving mode system comprising:
    a multiple-speed, change-gear mechanical transmission;
    a manually operated selection device for selecting one of an automatic transmission mode and a manual transmission mode, and for selecting a gear ratio;
    a processing unit for receiving inputs indicative of operation of said selection device and for processing said inputs according to predetermined logic rules to determine currently engaged and allowably engaged gear ratios and throttle positions, for changing between automatic and manual transmission modes, and for issuing command output signals to non-manually controlled operators, wherein said processing unit sets both a default start mode, representing one of said automatic transmission mode and manual transmission mode, and a default start gear ratio when said selection device is placed in an activation position for a predetermined period of time;

an activator responsive to said processing unit for toggling said transmission between said automatic and manual transmission modes; and a cruise control, wherein upon driver activation of said cruise control while said transmission is in said manual transmission mode, said processing unit temporarily invokes said automatic transmission mode, and upon de-activation of said cruise control, said processing unit re-establishes manual transmission mode.

11. A driving system as recited in claim 10, wherein movement of said selection device into said activation position for an amount of time less than said predetermined period of time represents a shift to said processing unit.

12. A driving system as recited in claim 10, wherein said processing unit maintains said automatic transmission mode upon driver activation and deactivation of said cruise control when said system is in said automatic transmission mode prior to activation of said cruise control.

13. A driving mode system comprising:

a multiple-speed, change-gear mechanical transmission;

a manually operated selection device for selecting one of an automatic transmission mode and a manual transmission mode, and for selecting a gear ratio;

a processing unit for receiving inputs indicative of operation of said selection device and for processing said inputs according to predetermined logic rules to determine currently engaged and allowably engaged gear ratios and throttle positions, for changing between automatic and manual transmission modes, and for issuing command output signals to non-manually controlled operators;

an activator responsive to said processing unit that toggles said transmission between said automatic and manual transmission modes;

a cruise control, wherein upon driver activation of said cruise control while said transmission is in said manual transmission mode, said processing unit temporarily invokes said automatic transmission mode, and upon de-activation of said cruise control, said processing unit re-establishes manual transmission mode; and.

a power take off, wherein said processing unit temporarily invokes said manual transmission mode upon driver activation of power take off when said transmission is in said automatic transmission mode, with said automatic transmission mode re-established by said processing unit when said power take off is de-activated wherein said processing unit sets both a default start mode, representing one of said automatic transmission mode and manual transmission mode, and a default start gear ratio when said selection device is placed in an activation position for a predetermined period of time.

14. A driving system as recited in claim 13, wherein said processing unit maintains said manual transmission mode upon driver activation and deactivation of said power take off when said driving system is in said manual transmission mode prior to activation of said power take off.

15. A driving system as recited in claim 13, wherein said predetermined period of time is in a range of approximately one to three seconds.

16. A driving mode system comprising:

a multiple-speed, change-gear mechanical transmission;

a manually operated selection device for selecting one of an automatic transmission mode and a manual transmission mode, and for selecting a gear ratio;

a processing unit for receiving inputs indicative of operation of said selection device and for processing said inputs according to predetermined logic rules to determine currently engaged and allowably engaged gear ratios and throttle positions, for changing between automatic and manual transmission modes, and for issuing command output signals to non-manually controlled operators, wherein said processing unit sets both a default start mode, representing one of said automatic transmission mode and manual transmission mode, and a default start gear ratio when said selection device is placed in an activation position for a predetermined period of time;

an activator responsive to said processing unit for toggling said transmission between said automatic and manual transmission modes;

a power take off, wherein upon driver activation of said power take off while said transmission is in said automatic transmission mode, said processing unit temporarily invokes said manual transmission mode, and upon de-activation of said power take off, said processing unit re-establishes automatic transmission mode.

17. A driving system as recited in claim 16, wherein said processing unit maintains said manual transmission mode upon driver activation and deactivation of said power take off when said driving system is in said manual transmission mode prior to activation of said power take off.

18. A driving system as recited in claim 16, wherein movement of said selection device into said activation position for an amount of time less than said predetermined period of time represents a shift to said processing unit.

19. A driving system as recited in claim 18, wherein said predetermined period of time is in a range of approximately one to three seconds.

* * * * *